United States Patent Office 3,295,946
Patented Jan. 3, 1967

3,295,946
CONTROLLING VEGETATION WITH BENZYL THIOPYRIDINE OXIDES
John J. D'Amico, Charleston, W. Va., assignor to Monsanto Company, a corporation of Delaware
No Drawing. Original application Mar. 19, 1962, Ser. No. 180,853, now Patent No. 3,155,671, dated Nov. 3, 1964. Divided and this application Jan. 20, 1964, Ser. No. 343,437
5 Claims. (Cl. 71—2.5)

This application is a division of application Serial No. 180,853, filed March 19, 1962, now U.S. Patent 3,155,671, granted November 3, 1964.

This invention relates to a class of benzyl thiopyridine oxides and to the preparation thereof. More particularly, this invention relates to derivatives of 2-thiopyridine, 1-oxide which destroy or control undesired vegetation.

The compounds of the present invention may be represented by the following general formula:

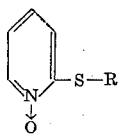

in which R represents halobenzyl, the number of halogen atoms being less than five. The halogen is preferably chlorine but bromine and to a lesser extent fluorine and iodine are also suitable. In general, halogenated benzyl comprise monohalobenzyl, 2,3-, 2,4-, 2,6- or 3,6-dihalobenzyl, 2,3,4-, 2,3,6-, 2,4,5- or 2,4,6-trihalobenzyl, 2,3,4,5- or 2,3,5,6-tetrahalobenzyl, alpha-methyl 2,6-dihalobenzyl and alpha-methyl 2,3,6-trihalobenzyl. Examples of the new compounds comprise 2-(o-methylbenzylthio)pyridine, 1-oxide
2-(p-methylbenzylthio)pyridine, 1-oxide
2-(o-chlorobenzylthio)pyridine, 1-oxide
2-(m-chlorobenzylthio)pyridine, 1-oxide
2-(p-chlorobenzylthio)pyridine, 1-oxide
2-(2,4-dimethylbenzylthio)pyridine, 1-oxide
2-(2,6-dimethylbenzylthio)pyridine, 1-oxide
2-(2,3-dichlorobenzylthio)pyridine, 1-oxide
2-(p-fluorobenzylthio)pyridine, 1-oxide
2-(p-bromobenzylthio)pyridine, 1-oxide
2-(m-bromobenzylthio)pyridine, 1-oxide
2-(2,6-diiodobenzylthio)pyridine, 1-oxide
2-(m-fluorobenzylthio)pyridine, 1-oxide
2-(3,6-dichlorobenzylthio)pyridine, 1-oxide
2-(o-fluorobenzylthio)pyridine, 1-oxide
2-(α-methyl, 2,6-dichlorobenzylthio)pyridine, 1-oxide
2-(α-methyl, 2,3,6-trichlorobenzylthio)pyridine, 1-oxide
2-(2,4,5-trichlorobenzylthio)pyridine, 1-oxide
2-(2,3,4-trichlorobenzylthio)pyridine, 1-oxide
2-(2,4,6-trichlorobenzylthio)pyridine, 1-oxide
2-(2,4,5-tribromobenzylthio)pyridine, 1-oxide
2-(2,4,6-tribromobenzylthio)pyridine, 1-oxide
2-(2,3,6-tribromobenzylthio)pyridine, 1-oxide
2-(2,3,5,6-tetrachlorobenzylthio)pyridine, 1-oxide and
2-(2,3,4,5-tetrachlorobenzylthio)pyridine, 1-oxide.

Benzyl thiopyridine oxides may be prepared by condensing the sodium salt of 2-thiopyridine, 1-oxide with the corresponding benzyl halide. The radical designated "ar,ar,ar-trichlorobenzyl" was derived from mixed isomers of chlorinated toluene containing an average of three chlorine atoms in the carbocyclic ring. Ring chlorination of toluene produces predominately the 2,3,6-isomer and accordingly the major proportion of the product is 2,3,6-trichlorotoluene. The product may be prepared as described by Kenneth L. Godfrey in United States Letters Patent 2,977,210 issued March 28, 1961. Godfrey also describes chlorination in the side chain to produce ar,ar,ar-trichlorobenzyl chloride. Bromination of the side chain produces an intermediate somewhat more reactive. Surprisingly, 2-(ar,ar,ar-trichlorobenzylthio)pyridine, 1-oxide is a more effective herbicide than any component known to be present. By subjecting them to the action of reducing agents the new compounds are converted to the corresponding pyridines. The invention will be fully understood and apparent from the detailed examples which follow.

*Example 1*

To a stirred solution of 30 grams (0.2 mole) of the sodium salt of 2-thiopyridine, 1-oxide in 200 ml. of water was added in one portion 25.4 grams (0.2 mole) of benzyl chloride and the mixture heated at 50–60° C. for 5 hours. After cooling to 25° C., 100 ml. of ethyl ether were added and the solution cooled to 10° C. with stirring. The precipitate which formed was filtered, washed with water until neutral to litmus and air-dried at 25–30° C. After recrystallization from ethyl alcohol, 2-(benzylthio)pyridine, 1-oxide was obtained in 50.9% yield as a tan solid melting at 170–172° C. Analysis gave 6.17% nitrogen and 14.74% sulfur compared to 6.45% nitrogen and 14.76% sulfur calculated for $C_{12}H_{11}NOS$.

*Example 2*

In this example ar,ar,ar-trichlorobenzyl bromide was used in place of benzyl chloride. 2-(ar,ar,ar-trichlorobenzylthio)-pyridine, 1-oxide in 72% yield was obtained as a tan solid melting at 229–230° C. after recrystallization from ethyl alcohol. Analysis gave 3.9% nitrogen, 9.8% sulfur and 33.1% chlorine compared to 4.4% nitrogen, 10.0% sulfur and 33.2% chlorine calculated for $C_{12}H_8Cl_3NOS$.

*Example 3*

To 15 grams (0.1 mole) of the sodium salt of 2-thiopyridine, 1-oxide in 100 ml. of water was added in one portion 23 grams (0.1 mole) of 2,3,6-trichlorobenzyl chloride and the mixture heated at 50–60° C. for 5 hours. After cooling to 10° C., 100 ml. of ethyl ether was added and the solution stirred at 5–10° C. for one-half hour. The low melting solids which precipitated were removed and discarded. The filtrate was allowed to stand for two days. The precipitate which formed was filtered and dried at 25–30° C. 2-(2,3,6-Trichlorobenzylthio)pyridine, 1-oxide was obtained in 59.4% yield as a tan solid melting at 237–238° C. after recrystallization from ethyl alcohol. Analysis gave 4.40% nitrogen, 9.88% sulfur and 33.18% chlorine compared to 4.4% nitrogen, 10.00% sulfur and 33.2% chlorine calculated for $C_{12}H_8Cl_3NOS$.

*Example 4*

Substituting 2,6-dichlorobenzyl chloride in the procedure of Example 1, the solution was stirred for 15 minutes at 5–10° C. after addition of ethyl ether. The precipitate was collected by filtration, washed with water until neutral to litmus and air-dried at 25–30° C. 2-(2,6-Dichlorobenzylthio)pyridine, 1-oxide was obtained in 66.4% yield as a gray solid melting at 213–216° C. Analysis gave 4.42% nitrogen compared to 4.89% calculated for $C_{12}H_9Cl_2NOS$.

*Example 5*

To a stirred solution of 15 grams (0.1 mole) of the sodium salt of 2-thiopyridine, 1-oxide in 150 ml. of water was added 18.5 grams (0.1 mole) of m-methylbenzyl bromide and the mixture heated at 50–60° C. for 5 hours. There was then added 200 ml. of water and the solution cooled to 5° C. The precipitate which formed was filtered, washed with water until neutral to litmus and air-dried at 25–30° C. 2-(m-methylbenzylthio)pyridine, 1-oxide was obtained in 82.4% yield as a tan solid melting at 108–110° C. after recrystallization from ethyl alcohol. Analysis gave 5.92% nitrogen and 13.57% sulfur compared to 6.06% nitrogen and 13.86% sulfur calculated for $C_{13}H_{13}NOS$.

The new compounds of this invention have general herbicidal properties. The method of controlling vegetation according to this invention comprises applying thereto a toxic concentration of the above-defined benzyl thiopyridine oxides. By applying the toxicants to vegetation is meant any means whereby the toxicant is brought into contact with living plants. The toxicant may be applied conveniently in the form of a spray containing the active ingredient in a concentration within the range of 0.1%–10.0% by weight. Thorough coverage of the foliage is effective for contact killing. For pre-emergence control amounts within the range of ½–60 pounds per acre have been used successfully.

In general, in the application of these compounds aqueous dispersions or aqueous solutions depending on whether or not the compound is water soluble, will be found most desirable. The dispersions will generally contain a dispersing or wetting agent and the solutions also preferably contain wetting agents to facilitate the spreading of the solution. As dispersing and wetting agents there may be employed soft or hard sodium or potassium soaps, alkylated aromatic sodium sulfonates such as sodium dodecylbenzene-sulfonate, or an amine salt of dodecylbenzene-sulfonic acid, alkali metal salts of sulfated fatty alcohols, ethylene oxide condensation products of alkyl phenols or tall oil and other dispersing and wetting agents. Petroleum hydrocarbon fractions, especially those high in aromatic constituents, are desirable carriers. Particulate solid carriers may be used where desired, as for example various clays, and the toxicants applied in dust or granular form.

A spray containing various concentrations of the active ingredient shown in Table I was applied to the foliage of bean plants, to the foliage of a mixture of grasses and finally to the foliage of a mixture of broadleaved plants. The mixture is indicated in the table as "Broadleaf." A rating of 0 indicates no phytotoxicity, 1 slight, 2 moderate and 3 severe phytotoxicity.

TABLE I

| Active Ingredient | Conc., percent | Phytotoxicity Rating | | |
|---|---|---|---|---|
| | | Bean | Grass | Broadleaf |
| 2-(benzylthio)pyridine, 1-oxide | 0.5 | 0 | 2 | 2 |
| 2-(ar,ar,ar-trichlorobenzylthio)-pyridine, 1-oxide | 0.5 | 2 | 3 | 3 |
| | 0.2 | 1 | 3 | 3 |
| 2-(m-methylbenzylthio)pyridine, 1-oxide | 0.5 | 1 | 2 | 2 |

The data recorded in Table II demonstrate pre-emergence activity. The toxicant was applied at the rate of 25 pounds per acre and the phytotoxicity observed.

TABLE II

| Active Ingredient | Results Observed |
|---|---|
| 2-(benzylthio)pyridine, 1-oxide | Severe phytotoxicity to crab grass and pigweed; moderate phytotoxicity to sugar beet and foxtail. |
| 2-(ar,ar,ar-trichlorobenzylthio)pyridine, 1-oxide | Severe phytotoxicity to morning glory, wild oats, brome grass, rye grass, foxtail, crab grass, pigweed and cotton; moderate phytotoxicity to mustard (radish), sugar beet, buckwheat and field bindweed. |
| 2-(m-methylbenzylthio)pyridine, 1-oxide | Severe phytotoxicity to wild oats, foxtail, crab grass, pigweed and wild buckwheat; moderate phytotoxicity to sugar beet and sorghum. |

Furthermore, at 5 pounds per acre 2-(ar,ar,ar-trichlorobenzylthio)-pyridine, 1-oxide and 2-(2,6-dichlorobenzylthio)pyridine, 1-oxide were severely toxic to wild oats, crab grass, pigweed, wild buckwheat, annual morning glory and sorghum.

It is intended to cover all changes and modifications of the examples of the invention herein chosen for purposes of disclosure which do not constitute departures from the spirit and scope of the invention.

What is claimed is:

1. The method of controlling vegetation which comprises applying thereto a phytotoxic concentration of a benzylthiopyridine oxide having the general formula

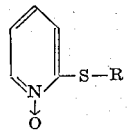

where R is selected from the group consisting of monohalobenzyl, 2,3-, 2,4-, 2,6- and 3,6-dihalobenzyl, 2,3,4-, 2,3,6-, 2,4,5- and 2,4,6-trihalobenzyl, 2,3,4,5- and 2,3,5,6-tetrahalobenzyl alpha-methyl 2,6-dihalobenzyl and alpha-methyl 2,3,6-trihalobenzyl.

2. The method of controlling vegetation which comprises applying thereto a phytotoxic concentration of 2-(2,6-dichlorobenzylthio)pyridine, 1-oxide.

3. The method of controlling vegetation which comprises applying thereto a phytotoxic concentration of 2-(polychlorobenzylthio)pyridine, 1-oxide in which the polychlorobenzyl is composed of mixed isomers containing an average of three chlorine atoms in the benzyl radical.

4. The method of controlling vegetation which comprises applying thereto a phytotoxic concentration of 2-(2,3,6-trichlorobenzylthio)pyridine, 1-oxide.

5. A herbicidal composition comprising a major proportion of a herbicidal adjuvant as carrier and a minor proportion sufficient to exert phytotoxicity of a phytotopic halobenzyl thiopyridine oxide having the general formula

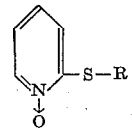

where R is selected from the group consisting of monohalobenzyl, 2,3-, 2,4-, 2,6- and 3,6-dihalobenzyl, 2,3,4-, 2,3,6-, 2,4,5- and 2,4,6-trihalobenzyl 2,3,4,5- and 2,3,5,6-tetrahalobenzyl, alpha-methyl 2,6-dihalobenzyl and alpha-methyl 2,3,6-trihalobenzyl.

References Cited by the Examiner

UNITED STATES PATENTS

| 2,826,584 | 3/1958 | Cislak. | |
|---|---|---|---|
| 2,922,792 | 1/1960 | Rockett | 71—2.5 X |
| 2,932,647 | 4/1960 | Rockett | 71—2.5 X |
| 2,940,978 | 6/1960 | Brown | 71—2.5 X |
| 3,107,994 | 10/1963 | Rawlings et al. | 71—2.5 X |

FOREIGN PATENTS 758,658  10/1956  Great Britain.

OTHER REFERENCES

Martin, Guide to Chemicals Used in Crop Protection, 3rd edition, 1957, page S40.

LEWIS GOTTS, *Primary Examiner.*

JAMES O. THOMAS, *Examiner.*